(12) United States Patent
Zhu et al.

(10) Patent No.: US 10,034,195 B2
(45) Date of Patent: *Jul. 24, 2018

(54) SYSTEM AND METHOD OF RANK ADAPTATION IN MIMO COMMUNICATION SYSTEM

(71) Applicant: Intel Corporation, Santa Clara, CA (US)

(72) Inventors: Yuan Zhu, Beijing (CN); Xiaogang Chen, Hillsboro, OR (US); Huaning Niu, Milpitas, CA (US); Qinghua Li, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 15/205,964

(22) Filed: Jul. 8, 2016

(65) Prior Publication Data

US 2016/0323027 A1 Nov. 3, 2016

Related U.S. Application Data

(63) Continuation of application No. 13/976,898, filed as application No. PCT/US2011/053683 on Sep. 28, 2011, now Pat. No. 9,445,299.

(Continued)

(51) Int. Cl.
*H04B 3/46* (2015.01)
*H04W 28/02* (2009.01)
(Continued)

(52) U.S. Cl.
CPC ...... *H04W 28/0231* (2013.01); *H04B 7/0413* (2013.01); *H04B 7/0417* (2013.01);
(Continued)

(58) Field of Classification Search
CPC ... H04L 5/0057; H04L 5/0094; H04L 1/0013; H04L 1/0026; H04L 1/0009;
(Continued)

(56) References Cited

U.S. PATENT DOCUMENTS 8,605,905 B2  12/2013  Liu et al.
8,654,740 B2   2/2014  Zhu et al.
(Continued)

FOREIGN PATENT DOCUMENTS

CN  102017451 A   4/2011
KR  20080079381 A  9/2008

OTHER PUBLICATIONS

Letters of Patent issued for Chinese Patent Application No. 201180070510.0, dated Aug. 17, 2016, 2 pages including 1 page of English translation.

(Continued)

*Primary Examiner* — Khanh C Tran
(74) *Attorney, Agent, or Firm* — Compass IP Law PC

(57) ABSTRACT

An apparatus may include a transmitter arranged to wirelessly transmit channel status reports for channels within a transmission band to a base station and a processor. The apparatus may further include a rank adaptation (RA) module operable on the processor to direct the transmitter to send a multiplicity of sub-band channel quality indicator (CQI) reports, each sub-band CQI report comprising a measurement of a respective sub-band of the transmission band and a multiplicity of rank indicator (RI) reports, where each sub-band CQI report is accompanied by an RI report. The apparatus may further include a digital display arranged to display information transmitted via the base station to the apparatus. Other embodiments are disclosed and claimed.

34 Claims, 16 Drawing Sheets

Related U.S. Application Data

(60) Provisional application No. 61/481,024, filed on Apr. 29, 2011.

(51) Int. Cl.

| | | |
|---|---|---|
| *H04N 21/2365* | (2011.01) | |
| *H04N 21/643* | (2011.01) | |
| *H04W 52/02* | (2009.01) | |
| *H04B 7/0456* | (2017.01) | |
| *H04W 72/04* | (2009.01) | |
| *H04W 48/06* | (2009.01) | |
| *H04L 12/803* | (2013.01) | |
| *H04L 12/801* | (2013.01) | |
| *H04L 29/06* | (2006.01) | |
| *H04L 1/18* | (2006.01) | |
| *H04L 5/00* | (2006.01) | |
| *H04J 11/00* | (2006.01) | |
| *H04L 27/26* | (2006.01) | |
| *H04L 1/00* | (2006.01) | |
| *H04B 7/0413* | (2017.01) | |
| *H04B 7/0417* | (2017.01) | |
| *H04W 68/00* | (2009.01) | |
| *H04B 7/0452* | (2017.01) | |
| *H04W 72/12* | (2009.01) | |
| *H04W 12/06* | (2009.01) | |
| *H04W 12/08* | (2009.01) | |
| *H04W 88/02* | (2009.01) | |
| *H04W 4/70* | (2018.01) | |
| *H04W 88/06* | (2009.01) | |
| *H04W 36/14* | (2009.01) | |
| *H04B 7/06* | (2006.01) | |
| *H04W 84/12* | (2009.01) | |
| *H04W 88/10* | (2009.01) | |

(52) U.S. Cl.
CPC ......... *H04B 7/0452* (2013.01); *H04B 7/0482* (2013.01); *H04B 7/0486* (2013.01); *H04J 11/0046* (2013.01); *H04L 1/0032* (2013.01); *H04L 1/1812* (2013.01); *H04L 1/1861* (2013.01); *H04L 5/0025* (2013.01); *H04L 5/0026* (2013.01); *H04L 5/0035* (2013.01); *H04L 5/0048* (2013.01); *H04L 5/0051* (2013.01); *H04L 5/0053* (2013.01); *H04L 5/0055* (2013.01); *H04L 5/0057* (2013.01); *H04L 5/0092* (2013.01); *H04L 5/0094* (2013.01); *H04L 27/2602* (2013.01); *H04L 27/2613* (2013.01); *H04L 47/125* (2013.01); *H04L 47/14* (2013.01); *H04L 63/10* (2013.01); *H04L 65/4076* (2013.01); *H04N 21/2365* (2013.01); *H04N 21/64322* (2013.01); *H04W 4/70* (2018.02); *H04W 12/06* (2013.01); *H04W 12/08* (2013.01); *H04W 28/0268* (2013.01); *H04W 48/06* (2013.01); *H04W 52/0203* (2013.01); *H04W 52/0219* (2013.01); *H04W 68/005* (2013.01); *H04W 72/042* (2013.01); *H04W 72/0406* (2013.01); *H04W 72/0413* (2013.01); *H04W 72/1247* (2013.01); *H04W 88/02* (2013.01); *H04B 7/0465* (2013.01); *H04B 7/0478* (2013.01); *H04B 7/0632* (2013.01); *H04W 36/14* (2013.01); *H04W 84/12* (2013.01); *H04W 88/06* (2013.01); *H04W 88/10* (2013.01); *Y02D 70/00* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/168* (2018.01); *Y02D 70/21* (2018.01); *Y02D 70/26* (2018.01); *Y02D 70/444* (2018.01)

(58) Field of Classification Search
CPC ............ H04L 25/03019; H04B 7/0456; H04B 7/0626; H04B 7/0478; H04B 7/0486; H04B 7/0632; H04B 7/0647; H04B 7/0482; H04B 7/0452; H04B 7/486; H04B 7/639; H04B 7/417; H04W 24/10; H04W 72/04; H04W 72/085; H04J 11/0046

See application file for complete search history.

(56) References Cited

U.S. PATENT DOCUMENTS

| | | | |
|---|---|---|---|
| 8,705,472 B2 | 4/2014 | Taoka et al. | |
| 2008/0187062 A1* | 8/2008 | Pan | H04B 7/0417 375/260 |
| 2009/0017769 A1* | 1/2009 | Chen | H04B 7/0417 455/69 |
| 2009/0201861 A1* | 8/2009 | Kotecha | H04L 1/0027 370/329 |
| 2009/0268698 A1 | 10/2009 | Lee et al. | |
| 2010/0215114 A1 | 8/2010 | Kim et al. | |
| 2011/0013581 A1 | 1/2011 | Lee et al. | |
| 2011/0032839 A1 | 2/2011 | Chen et al. | |
| 2011/0243017 A1* | 10/2011 | Prasad | H04W 72/085 370/252 |
| 2012/0051544 A1 | 3/2012 | Liu et al. | |
| 2012/0063500 A1* | 3/2012 | Wang | H04L 1/0026 375/224 |
| 2012/0106470 A1 | 5/2012 | Clerckx et al. | |
| 2013/0343328 A1 | 12/2013 | Nilsson et al. | |

OTHER PUBLICATIONS

"MIMO System Performance with Variable Frequency Granularity of UE Feedback", Samsung, 3GPP Draft, R1-070577, Jan. 18, 2007, 14 pages. (author unknown).

Extended European Search Report received for European Patent Application No. 11864431.9, dated Nov. 10, 2015, 11 pages.

Final Office Action for U.S. Appl. No. 13/976,898, dated Apr. 1, 2015, 12 pages.

Final Office Action for U.S. Appl. No. 13/976,898, dated Jan. 13, 2016, 12 pages.

International Preliminary Report on Patentability received for International Application No. PCT/US2011/053683, dated Nov. 7, 2013, 6 pages.

International Search Report and Written Opinion, dated May 4, 2012, Application No. PCT/US2011/053683, Filed Date: Sep. 28, 2011, pp. 9.

Notice of Allowance for U.S. Appl. No. 13/976,898, dated Jul. 20, 2016, 2 pages.

Notice of Allowance for U.S. Appl. No. 13/976,898, dated May 4, 2016, 8 pages.

Notice of Allowance received for Chinese Patent Application No. 201180070510.0 dated Jun. 21, 2016, 5 pages including 3 pages of English translation.

Office Action for U.S. Appl. No. 13/976,898, dated Aug. 7, 2015, 12 pages.

Office Action for U.S. Appl. No. 13/976,898, dated Jun. 30, 2014, 9 pages.

Office Action received for Chinese Patent Application No. 201180070510.0 dated Mar. 28, 2016, 8 pages, including 5 pages of English translation.

(56) References Cited

OTHER PUBLICATIONS

Office Action received for Chinese Patent Application No. 2011800705100, dated Aug. 13, 2015, 25 pages, including 16 pages of English translation.
Partial Supplementary European Search Report received for European Patent Application No. 11864431.9, dated Jul. 22, 2015, 7 pages.

* cited by examiner

FIG. 7a
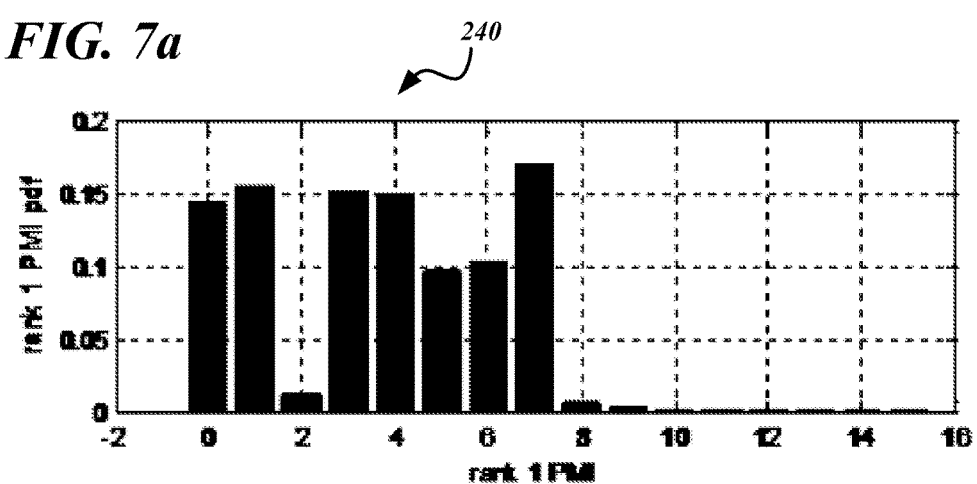
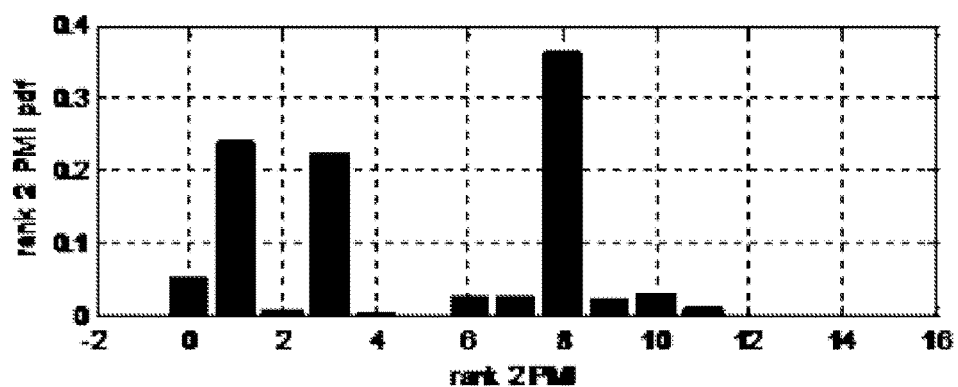
FIG. 7b

1020

DETERMINE A BEST RANK 1 PMI $I_0$ ACCORDING TO $$i_0 = \underset{v_i \in C_0}{\mathrm{argmax}}(trace(v_i^H R v_i))$$

*1022*

↓

SET BEST PMI $I_r$ FOR HIGHER LEVEL
RANK $r$ ACCORDING TO $$i_r = i_0, r \neq 0$$

*1024*

↓

SELECT BEST RANK $r_{best}$ ACCORDING TO $$r_{best} = \underset{0 < r < r_{max}}{\mathrm{argmax}}(capacity(v_{i_r}, H, SINR))$$

SYSTEM AND METHOD OF RANK ADAPTATION IN MIMO COMMUNICATION SYSTEM

This application is a continuation of, claims the benefit of and priority to previously filed U.S. patent application Ser. No. 13/976,898 filed Jun. 27, 2013, which has priority to International Patent Application Number PCT/US2011/053683, filed on Sep. 28, 2011, which has priority to U.S. Provisional Patent Application No. 61/481,024 filed on Apr. 29, 2011; all of which are incorporated herein by reference in their entirety.

BACKGROUND

The use of multiple input multiple output (MIMO) technology has attracted increased attention for use in wireless communications systems because MIMO offers significant increases in data throughput and link range without requiring additional bandwidth or transmit power. The increased performance afforded by MIMO technology stems from higher spectral efficiency (greater number of bits transmitted per second per Hertz of bandwidth), as well as greater link reliability or diversity. Accordingly, MIMO forms an important part of modern wireless communications standards including 3GPP Long Term Evolution (see 3GPP TS 36.213, section Technical Specification Release 10, June 2011, 3rd generationPartnership Project), IEEE 802.11n (WiFi), 802.16 (WiMAX) and HSPA+.

One area of concern is the ability to provide robust rank adaptation. Rank adaption refers to the dynamic control of rank according to changing channel conditions. The channel conditions may be determined by such parameters as signal to interference and noise ratio (SINR) and fading correlation between antennae in a MIMO system. With the use of spatial multiplexing, a base station (or eNodeB, or eNB) may send multiple data streams or layers to UEs in a downlink transmission using the same frequency. The number of such layers or streams is defined as the rank. The UE may periodically measure a channel and send a recommendation of the rank to the eNB. The so called rank indicator (RI) may be sent periodically or aperiodically in different schemes. Because the RI reported to the eNB may change with time, the eNB may adjust the number of data streams used in a downlink transmission, based upon the changing RI received from the UE. However, several factors may render this process less than ideal. In some circumstances, the interference levels that may affect channel quality can change substantially between two successive RI reports, in which case, the eNB has no occasion to adjust the rank even though the last reported rank may not be appropriate due to the changed interference conditions. In other circumstances, when a so-called wideband rank is used, the rank indicator reported may be based upon an entire transmission band (wideband), which may be composed of a group of frequency sub-bands used for communications between the UE and eNB. In many cases, the interference conditions may vary substantially between different sub-bands within the wideband, thereby compromising the validity of a wideband RI reported by the eNB for individual sub-bands.

Another concern has been raised regarding the use of multiuser MIMO (MU-MIMO) where a UE may transmit precoding matrix indicator/channel quality indicator (PMI/CQI) reports with too high a rank to effectively support the most efficient MU-MIMO scheduling. In MU-MIMO an eNB may schedule multiple different UEs for transmission over the same transmission band. The reporting of an excessively high rank may arise as a consequence of the fact that the UE can only evaluate its own link performance, and in general is not aware of any co-scheduling candidates in the MU-MIMO scheme. As a consequence, even though the link performance to a UE may be maximized by a high rank single user MIMO (SU-MIMO transmission), the system performance may very well be higher if the UE and a second terminal (unbeknownst to the UE) are co-scheduled using lower rank transmissions. The reported information including PMI/CQI/RI may therefore be ill-matched to a MU-MIMO allocation. In particular, the terminal may often select a too high transmission rank to be beneficial for MU-MIMO scheduling.

In other circumstances, where the eNB prefers operating under SU-MIMO transmissions, the UE may report a rank of 1, although the eNB may prefer the UE to report an adapted rank, rather than always reporting a rank of 1.

It is with respect to these and other considerations that the present improvements have been needed.

BRIEF DESCRIPTION OF THE DRAWINGS

FIGS. 7a and 7b present a comparison of known rank 1 and rank 2 PMI distributions.

FIG. 10b depicts a further logic flow consistent with other embodiments.

DETAILED DESCRIPTION

Various embodiments may be generally directed to systems that employ wireless communications using multiple input multiple output (MIMO) wireless communications. Some embodiments may be particularly directed to apparatus, architecture and methods for rank adaptation.

Various embodiments may comprise one or more elements. An element may comprise any structure arranged to perform certain operations. Although an embodiment may be described with a limited number of elements in a certain arrangement by way of example, the embodiment may include more or less elements in alternate arrangement as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In one embodiment, a method comprises measuring, over a wireless transmission band, a multiplicity of sub-band channel quality indicators (CQI), each sub-band CQI corresponding to a respective frequency sub-band of the transmission band; transmitting one or more sub-band CQI of the multiplicity of sub-band CQIs at a first instance; selecting one or more rank indicators (RI) for the transmission band; and transmitting, at the first instance, one or more RI reports corresponding to the selected one or more RIs.

The method may also include transmitting each sub-band CQI report periodically.

Alternatively, the method may further include transmitting a multiplicity of sub-band PMI reports, each sub-band PMI report corresponding to a respective sub-band CQI report.

The method may also include transmitting a sub-band RI report with a respective sub-band CQI report, each sub-band RI report and respective sub-band CQI report corresponding to a same sub-band of the transmission band.

The method may additionally include transmitting the sub-band CQI reports aperiodically, which in a first implementation, may involve selecting from within the transmission band a multiplicity of band part rank indicators, each band part RI based upon a measurement of a multiplicity of contiguous sub-bands and transmitting, with the sub-band CQI reports, a multiplicity of band part RI reports each derived from a selected band part RI; while in a second implementation, may involve selecting from within the transmission band a multiplicity of sub-band rank indicators each based upon a measurement of a respective frequency sub-band of the transmission band, and transmitting, with the sub-band CQI reports, a multiplicity of sub-band RI reports each containing a respective sub-band RI.

Figure 1:
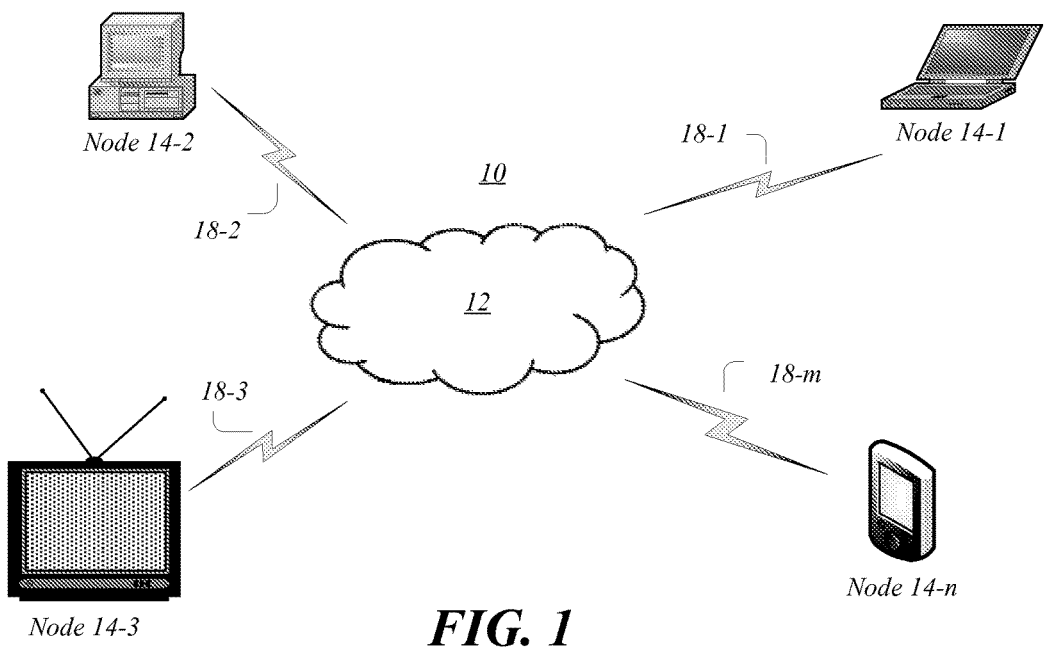
FIG. 1 illustrates one embodiment of a communications system.

FIG. 1 illustrates a block diagram of one embodiment of a communications system 10 that may include embodiments of the channel estimation architecture disclosed herein. As shown in FIG. 1, the communications system 10 may comprise a network 12 that communicates over links 18-*m* with a plurality of nodes 14-*n*, where m and n may represent any positive integer value. In various embodiments, the nodes 14-*n* may be implemented as various types of wireless devices. Examples of wireless devices may include, without limitation, a station, a subscriber station, a base station, a wireless access point (AP), a wireless client device, a wireless station (STA), a laptop computer, ultra-laptop computer, portable computer, personal computer (PC), notebook PC, handheld computer, personal digital assistant (PDA), cellular telephone, combination cellular telephone/PDA, smartphone, pager, messaging device, media player, digital music player, set-top box (STB), appliance, workstation, user terminal, mobile unit, consumer electronics, television, digital television, high-definition television, television receiver, high-definition television receiver, and so forth.

In some embodiments, a multiplicity of devices in communications system 700 may employ multiple input and multiple output (MIMO) communications in which both receiver and transmitter employ multiple antennae. Some embodiments of a communications system may be implemented with a radio technology such as IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. LTE-advance (LTE-A) is an evolution of the 3GPP LTE.

For clarity, the following description may focus on embodiments related to LTE-A. However, other embodiments may employ other standards, as noted above.

Figure 2A:
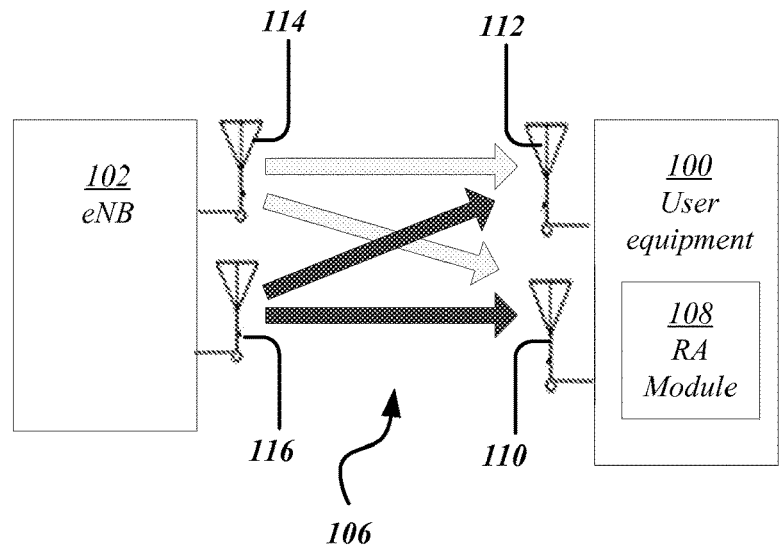
FIGS. 2a and 2b depict operation of a UE according to various embodiments.
Figure 2B:
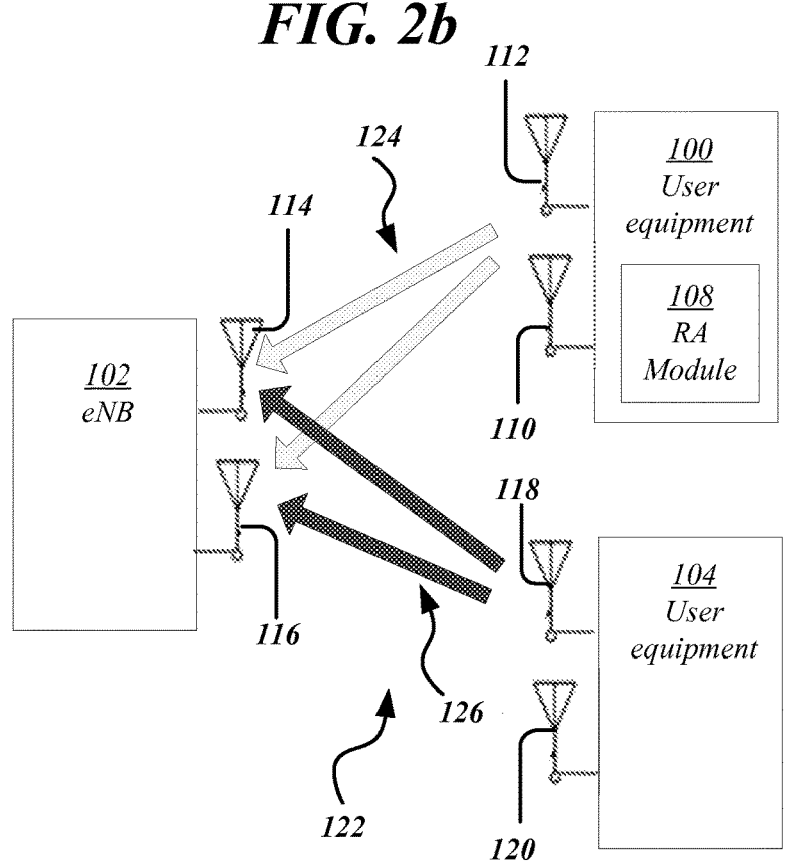

FIGS. 2a and 2b depict operation of a UE 100 according to various embodiments. The UE 100 may be scheduled to operate in either an SU-MIMO mode (FIG. 2a) or an MU-MIMO mode (FIG. 2b). In one implementation of an SU-MIMO mode depicted in FIG. 2a, an eNB 102 may transmit downlink signals 106 from each of two antennae 114, 116. As illustrated in FIG. 2a, each antenna 114, 116 transmits a signal to each of two UE antennae 110, 112. However, in some embodiments, UE 100 and eNB 102 may each have additional antennae.

UE 100 may also operate in MU-MIMO mode, as depicted in FIG. 2b. UE 100 and a separate terminal (UE 104), which may operate in a conventional manner, are each depicted as transmitting respective signals 124 and 126 that form a portion of uplink signals 122 received by eNB 102 during an uplink communication. In the uplink communication depicted, signals 124 are sent from antenna 112 and may be received at antennae 114 and 116 of eNB 102. The signals 124 may be provided over a physical uplink control channel (PUCCH) in various embodiments. Similarly, the additional UE device 104 transmits signals 126 from antenna 118, which may also be received at antennae 114, 116 of eNB 102. However, other configurations of MU-MIMO are possible.

In various embodiments, the uplink signals 124 sent from UE 100 may include control signals such as RI, PMI, and CQI, among others. At least some of the control signals transmitted by UE 100 may be reported in a regular periodic fashion or in an aperiodic fashion in different embodiments. In various embodiments, UE is arranged to modify communications with eNB in order to provide for robust rank adaptation. For example, UE 100 may operate in an environment in which interference changes substantially over time. The interference may take place in a rapid an unpredictable manner. It may therefore be desirable to change the rank reported to the eNB in a timely fashion to account for substantial interference changes that may alter the preferred rank. In accordance with various standards, the framework for reporting of control signals, which may include channel status information (CSI) such as PMI/CQI/RI reports (also termed "channel status reports" hereinafter) may limit the flexibility in reporting RI information. In some embodiments, the UE may provide a more effective framework for channel status reports that updates RI in a more effective manner. The UE 100 may include, for example, a rank adaptation (RA) module 108, which may perform various functions such as determining rank information to be reported and scheduling rank indicator reports, as detailed below. In particular RA module 105 may implement the procedures and architecture depicted in the FIGS. 3-10 and discussed below.

Figure 3A:
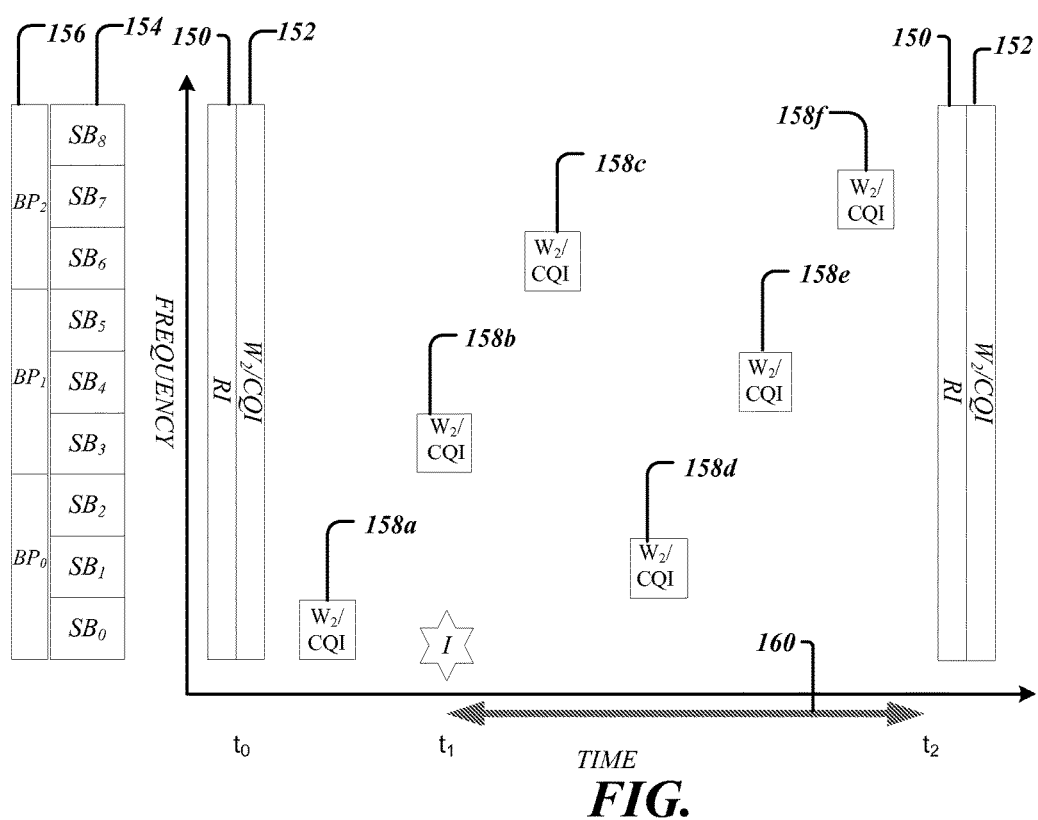
FIGS. 3a and 3b compare conventional architecture and an enhanced architecture for providing channel status reports in accordance with some embodiments.
Figure 3B:
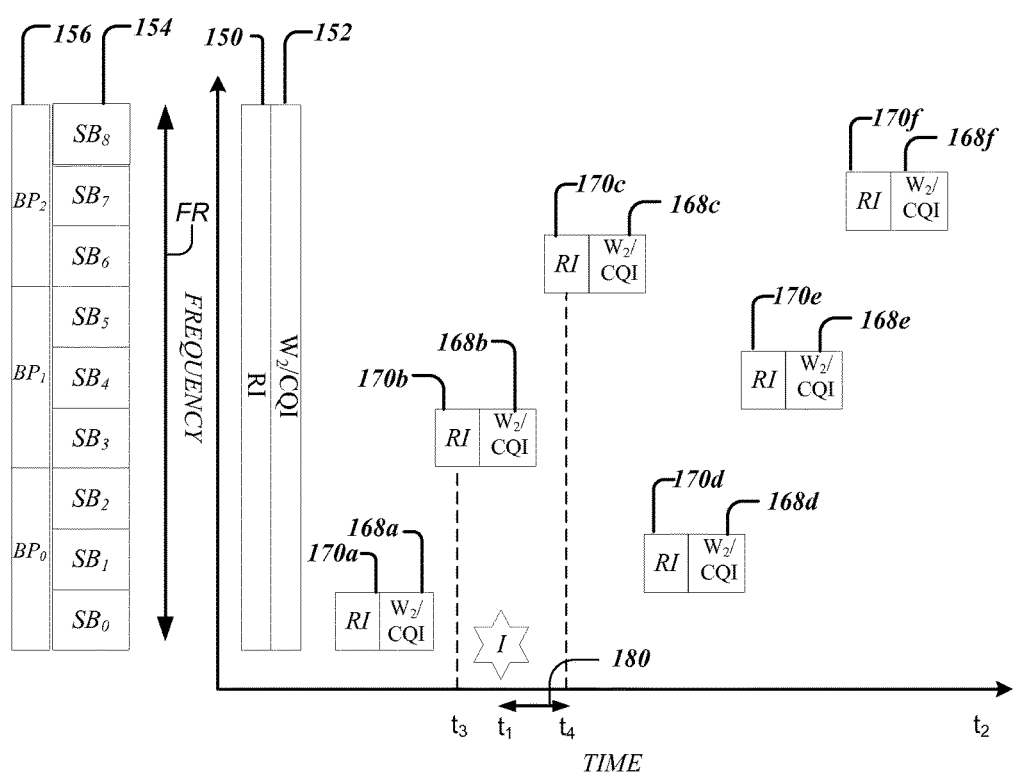

FIGS. 3a and 3b depict operation of an enhanced framework for channel status reports in accordance with some embodiments. In FIG. 3a, a framework for providing channel status reports is illustrated based upon the timing specified in LTE release 10. In particular, the scenario shown depicts CQI/PMI/RI timing as specified for PUCCH 2-1 sub-band reporting mode. The uplink communication is divided into nine contiguous sub-bands 154 that comprise a transmission band. The sub-bands 154 may be grouped into three band parts 156. At time $t_0$, a wideband (W2) rank indicator report 150 and CQI/PMI report 152 ("PMI" is not explicitly shown in the label for clarity) are transmitted consistent with wideband channel conditions representing the frequency range FR of the transmission band. When the RI report 150 is transmitted to an eNB, the downlink rank may be updated in accordance with the reported RI. For example, the rank may be rescheduled from "2" to "4" after RI report 150 is received.

In accordance with the PUUCH 2-1 sub-band reporting mode, a series of sub-band CQI/PMI reports 158a-158f are transmitted over a subsequent time period corresponding to reporting period for the sub-band CQI/PMI measurements. Each CQI/PMI report 158a-f corresponds to a different sub-band of sub-bands SB0-SB8 and is reported at a different time that each other sub-band. As depicted in FIG. 3a, at time $t_1$, an interference event I takes place. For example, a strong new interferer may appear within the frequency range of W2. However, to conform to the reporting procedures specified by the LTE 2-1 sub-band reporting mode standard, a subsequent RI report may not be transmitted until at least a time $t_2$, which corresponds to the end of the current reporting period for all the CQI/PMI sub-band reports to be transmitted. Thus, during the entire time period 160 between $t_1$ and $t_2$, the rank may remain at "4," although interference conditions may warrant a change, such as a change to a rank of "1." Accordingly, communications may be degraded during this period 160.

In an embodiment depicted in FIG. 3b, the channel status report framework (architecture) is modified, for example, using an RA module 105, which may provide more timely RI adaptation. In this embodiment, a series of sub-band reports 168a-168f are arranged with a similar timing to CQI/PMI sub-band reports 158a-f. However, an RI report 170a-170-f is included in each respective sub-band report 168a-f. Thus, at time $t_3$, RI report 170b is provided, which may update the rank to "4" in one example. In the scenario in which a change in interference conditions takes place at time $t_1$ the channel status report architecture of the embodiment of FIG. 3b provides the ability to adapt the rank in a more timely fashion. As illustrated, an immediately subsequent RI report 170c may be provided at time $t_4$. Based upon channel measurements at time $t_4$, which reflect the change in interference that occurred at time $t_3$ and may persist, the UE may recommend a rank of "1" in the RI report 170c. Thus, the duration 180 between time $t_1$ and $t_4$, in which the operating rank (4) may be ill-suited to the present channel conditions, is reduced to a much smaller duration 180 than the duration 160 using the conventional framework of FIG. 3a.

In some embodiments, using the architecture generally depicted in FIG. 3b, the RI report that precedes the sub-band CQI/PMI reports may be designed as a wideband rank indicator, while in other embodiments, the RI report may be a sub-band RI that is applicable only to the given band part that is scanned by the sub-band CQI-PMI report.

Figure 4:
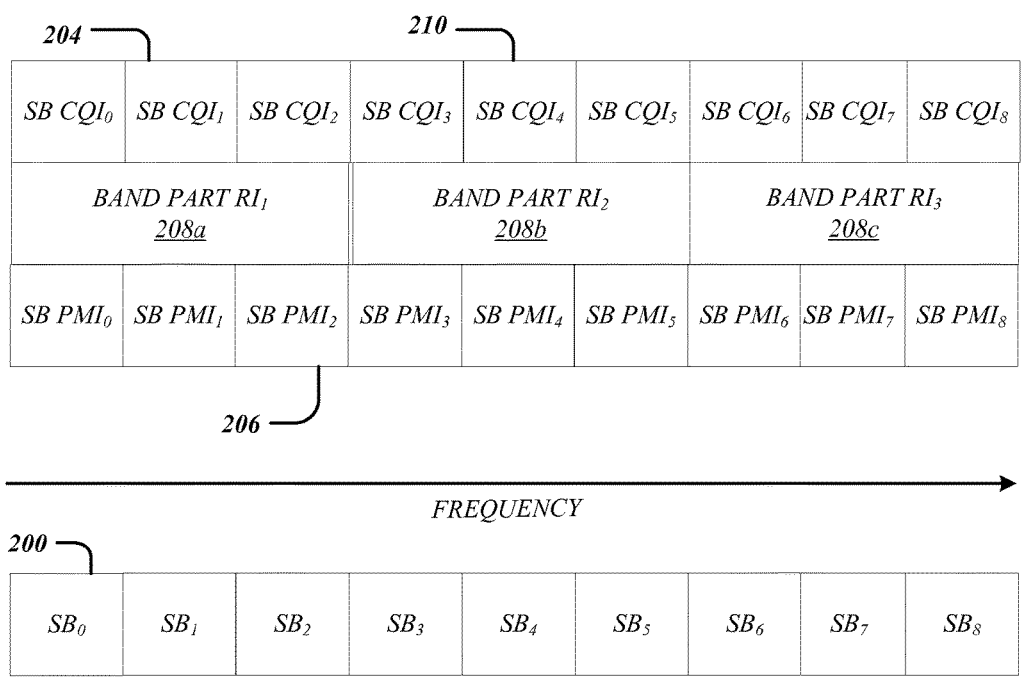
FIG. 4 depicts one embodiment of a CSI report structure that may be used to aperiodically report PMI/CQI/RI information.

In other embodiments in which CSI is provided aperiodically, the reporting of RI may be tailored to the band structure of the CSI reports. For example, CSI may be provided over a physical uplink shared channel (PUSCH) in an aperiodic fashion. FIG. 4 depicts one embodiment of a CSI report structure 204 that may be used to aperiodically report PMI/CQI/RI information. The report structure may be considered to a modification to PUSCH 3-2 report mode. As illustrated, the report structure 204 comprises a series of CSI sub-bands corresponding to the frequency sub-bands $SB_0$-$SB_9$ of frequency band 200. As illustrated, a corresponding PMI set of sub-band reports 206, comprising SB $PMI_0$-SB $PMI_8$ and CQI sub-band reports 210 comprising SB $CQI_0$-SB $CQI_8$ is provided for each sub-band $SB_0$-$SB_9$. In addition, a set of three RI reports (band part RI) 208a-208c are provided that each span three contiguous sub-bands. These RI reports accordingly provide RI spanning the frequency range defined by the three contiguous sub-bands in each case.

Figure 5:
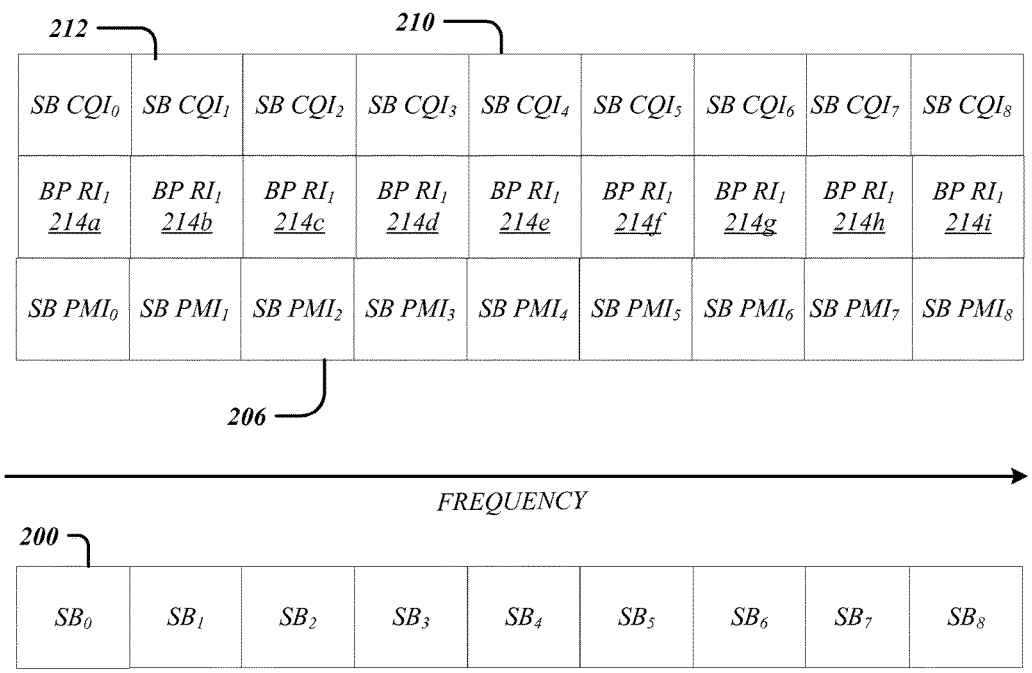
FIG. 5 depicts an embodiment of an aperiodic CSI report structure having sub-band RI reports.

Alternatively, aperiodic RI reports may be provided for each sub-band of a frequency band. FIG. 5 depicts an embodiment of a CSI report structure 212 that includes nine separate sub-band RI reports 214a-214i each corresponding to a sub-band frequency $SB_0$-$SB_8$. The band-part or sub-band rank indicators shown in the embodiments of respective FIGS. 4 and 5 may facilitate more accurate rank adaptation by providing aperiodic RI reports that cover a more narrow frequency range within a wideband and are therefore more likely to report a rank that accurately reflects the channel conditions within a given frequency range, which may differ substantially from those conditions in other frequency ranges within the same transmission band.

Figure 6:
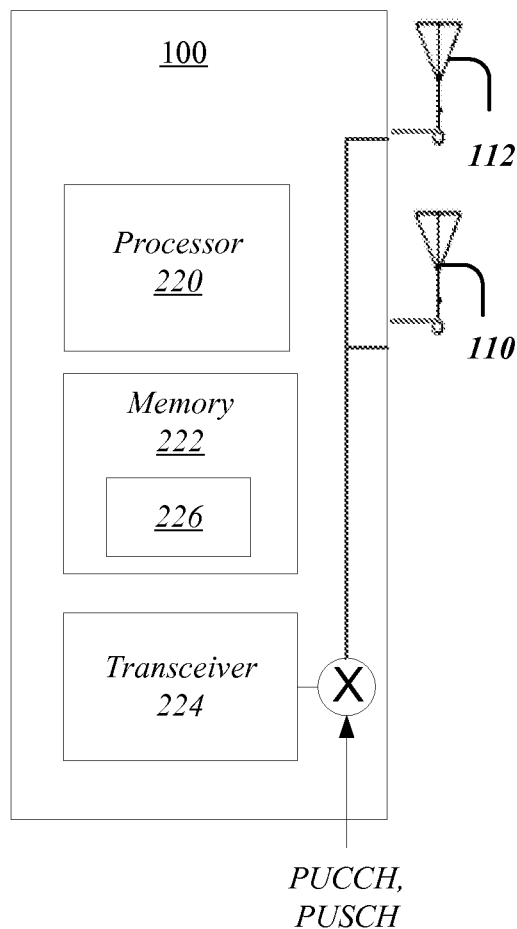
FIG. 6 depicts an embodiment of a UE.

In further embodiments, a UE may be arranged to modify the search process for selecting a PMI to be reported to the eNB and the process for determining a best rank indicator to report. FIG. 6 depicts an embodiment of a UE 100 that includes processor 220, memory 222, and transmitter 224. The antennae 110, 112 may serve both as transmitter (Tx) and receiver (Rx) antennae. Memory 222 may include a codebook(s) 226, which may include multiple ranks, for example 8 ranks. In some embodiments, the codebook 226 may be arranged generally as provided for in LTE release 10. In particular, codebook 226 may have a nested structure, such that for each precoder matrix of a given rank there exists at least one corresponding column in all codebooks of ranks lower than the given rank.

In one embodiment, the UE 100 may perform rank adaptation according to the following procedure. The UE 100 may perform channel measurements to determine various parameters described below. The processor 220 may perform a PMI search using codebook 226 according to $$i_r = \underset{v_i \in C_r}{\operatorname{argmax}}(\operatorname{trace}(v_i^H R v_i)) \quad (1)$$

where $C_r$ denotes a codebook having rank r, R is the measured channel covariance matrix for a given band, and $i_r$ denotes the best PMI for rank r. After the best PMI for a given rank r is selected in accordance with equation (1), the UE may select the best rank $r_{best}$ to report to a base station.

In one embodiment, $r_{best}$ is determined according to $$r_{best} = \underset{0<r<r_{max}}{\operatorname{argmax}}(\operatorname{capacity}(v_{i_r}, H, SINR)) \quad (2)$$

where H is the channel matrix of interest and SINR is the signal-to-noise-and-interference ratio per each Rx antenna. Thus, after determining the SINR, the UE can calculate $r_{best}$ and report both the best rank and the best PMI for the best rank to an eNB. In this manner, in single user MIMO operation, the capacity of SU-MIMO may be maximized when rank adaptation is performed.

In further embodiments, the UE may perform rank adaptation and PMI selection to enhance MIMO operation in an environment in which dynamic switching between single user MIMO and multiuser MIMO operation may take place. This may improve upon current procedures where the codebook is designed for rank 1 PMI searches.

As is known, codebook-based precoding generally involves storing a codebook (i.e. the set of precoding matrices) at both the transmitter and the receiver in advance of a communications session. The receiver then may follow specified rules to select the optimal precoding matrix according to the current channel state and return the PMI of the selected matrix to the transmitter. However, previous codebooks, such as LTE release 8 codebook, may not perform optimally in a MU-MIMO scenario or for dynamic switching between SU-MIMO and MU-MIMO.

In particular, under current codebook procedures, the best rank 2 PMI need not equal the best rank 1 PMI. Accordingly, current procedures for rank adaptation where high rank is reported may not result in the optimum PMI. As an example, when a UE performs rank adaptation and selects rank 2 for reporting, the UE needs to report one precoder and two channel quality indicators (CQI), each related to one column of the rank 2 precoder. In codebooks having a nested structure, such as the 4 Tx codebook specified by LTE release 8, all rank 2 precoders that have the same PMI value as that of a rank 1 will contain the corresponding rank 1 precoder as the first column in the rank 2 precoder. Although the rank 1 precoder coincides with a portion of the rank 2 precoder, this does not guarantee that the best rank 2 precoding matrix index will always equal the best rank 1 precoding matrix index.

To illustrate this problem further FIGS. 7a and 7b present a comparison of PMI distributions as specified by the LTE release 8 codebook. In particular, FIG. 7a shows the rank 1 PMI distribution 240, where the y-axis indicates the relative frequency for a given point of the distribution. The x-axis represents the different precoding matrix indices for the codebook. As depicted in FIG. 7a, the distribution 240 is relatively uniform. Between PMI values of zero to seven, the probability is about 10 to 15% for each index except for "2." As a result, when a UE performs a PMI search in rank 1 codebook, there is a great probability that the principle eigenvector will be chosen.

In contrast, FIG. 7b presents a rank 2 PMI distribution 250 based upon the LTE release 8 codebook. In this case, the PMI distribution 250 is much more non-uniform than the rank 1 PMI distribution 240. In particular, only PMIs "1," "3," and "8" have a significant probability, while all other PMIs have a probability of 5% or less. Accordingly, when a UE performs a PMI search in rank 2, there is a reasonable probability that two non-principal eigenvectors may have higher capacity than the principal eigenvector taken together with another vector orthogonal to the principal eigenvector. Thus, when an eNB receives a rank 2 PMI report and proceeds to extract the principal eigenvector from the rank 2 precoder, the eNB may not be able to find the principal eigenvector in the case of the higher capacity non-principal eigenvectors. Accordingly, rank adaptation between a rank 1 and rank 2 RI may not properly take place.

In accordance with further embodiments, the UE may be arranged to ensure that the rank 2 precoder always contains the principal eigenvector. In one implementation, this may be accomplished when the UE performs rank adaptation by determining the PMI only assuming rank 1. This is a reasonable approach since, as discussed above, all rank 2 precoders that have the same PMI value as that of a rank 1 by nature contain the corresponding rank 1 precoder. The RI may then be determined based upon use of the same PMI.

In order to determine the PMI regardless of the reporting rank, the following procedure may be followed. The UE may calculate the best PMI for rank 1 $i_0$ according to $$i_0 = \underset{v_i \in C_a}{\mathrm{argmax}}(\mathrm{trace}(v_i^H R v_i)) \qquad (3)$$

where $C_0$ is the codebook having rank 1.

In various embodiments, the best PMI for a rank higher than rank 1 may be assumed to be the same as a rank 1 PMI to take advantage of the nesting structure of codebooks, such as the LTE release 8 codebook, according to $$i_r = i_0, r \neq 0 \qquad (4).$$

The UE may then perform rank adaptation according to the procedure set forth in equation (2) above. Thus, the UE assures that the best higher rank precoder always contains the principal eigenvector which can be used for MU-MIMO transmission.

In various embodiments, the above procedure as set forth in Eqs. (3) and (4) may be implemented for different transmission modes between a UE and base station. For example, the procedure may be applied to all or a subset of those transmission modes that support reporting CQI/PMI/RI (CSI). In one implementation, the LTE RI reporting procedure may be modified by implementing a change in the standard for reporting CSI. The recent LTE standard (3GPP TS 36.213 V10.2.0, 6-2011) specifies nine transmission modes that a UE may employ to report CSI on an uplink control channel (PUUCH), including transmission modes 4, 8, and 9. The text for the section defining periodic CSI reporting (section 7.2.2) currently reads: For transmission mode 4, 8 and 9, the PMI and CQI are calculated conditioned on the last reported periodic RI. For other transmission modes they are calculated conditioned on transmission rank 1.

In one embodiment, this procedure may be modified as specified in the revised text: For transmission mode 4, 8 and 9, the PMI is calculated conditioned on rank 1 and CQI are calculated conditioned on the last reported periodic RI. For other transmission modes they are calculated conditioned on transmission rank 1. The reported PMI and COI are conditioned on the last reported RI.

In accordance with the disclosed embodiments, PMI search and rank adaptation procedures may be modified and optimized for either SU-MIMO or MU-MIMO operation. In alternate embodiments, an eNB may employ either broadcasting or unicasting to inform the UE about its preference for either SU-MIMO or MU-MIMO transmission. The eNB may dynamically change its preference due to changes in traffic conditions. In response, the UE may dynamically alter the rank adaptation methods employed between one method in favour of SU-MIMO and in favor of MU-MIMO. In particular, the UE may choose an optimum PMI search or rank adaptation procedure to employ, including those procedures outlined above with respect to Eqs. (1)-(4). The UE may base the choice on that procedure deemed to best match the transmission preference indicated by the eNB. In some embodiments, to minimize overhead, the signalling may comprises as little as one bit.

Included herein is a set of flow charts representative of exemplary methodologies for performing novel aspects of the disclosed communications architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
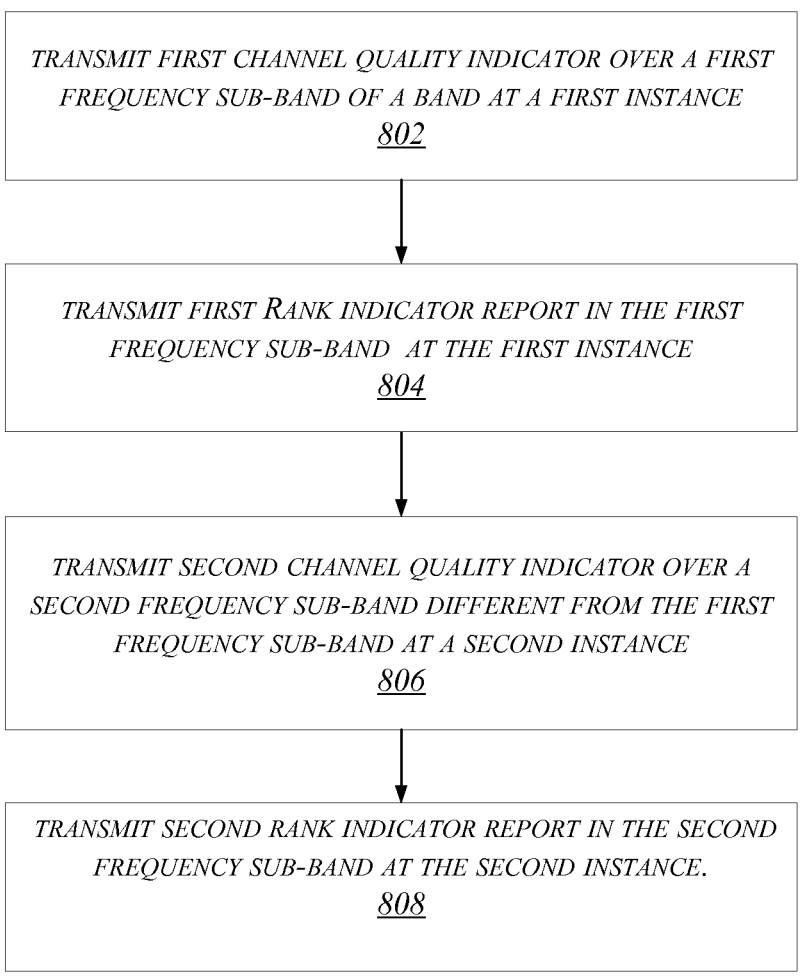
FIG. 8 depicts a logic flow in accordance with present embodiments.

FIG. 8 depicts a logic flow 800 in accordance with the present embodiments. At block 802 a first channel quality indicator is transmitted at a first instance over a first frequency sub-band of a transmission band. In various embodiments, a precoding matrix index may also be transmitted during block 802 and subsequent blocks. At block 804, a first rank indicator report is transmitted at the first instance over the first frequency sub-band. At block 806, a second channel quality indicator is transmitted over a second, different frequency-sub band at a second instance. The second frequency sub-band may be contiguous with the first frequency sub-band or may be non-contiguous. The first and second frequency sub-bands may belong to the same transmission band used in an uplink between a UE and base station. At block 808, a second rank indicator report is transmitted in the second frequency sub-band at the second instance. In various embodiments, additional CQI and RI reports may be transmitted together in other sub-bands at other instances. In this manner, each instance of reporting CQI information over a given transmission sub-band entails reporting of a rank indicator, which may be adapted between each reporting instance. The rank indicator may correspond to a wideband rank indicator or may be a sub-band RI that is applicable only to the given band part that is scanned by the sub-band CQI/PMI report.

Figure 9:
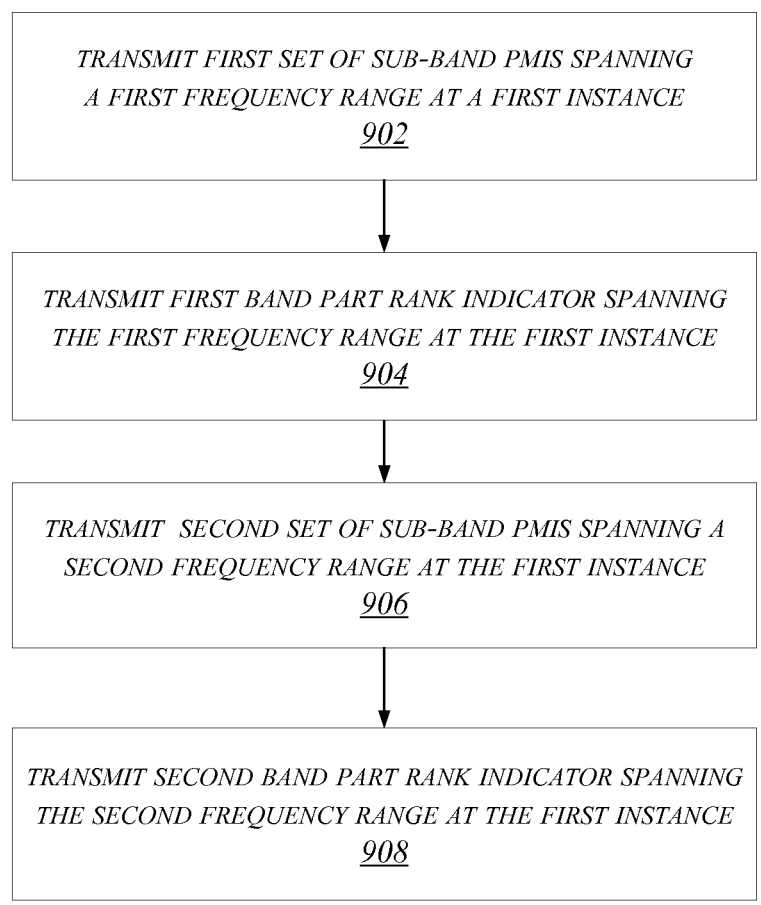
FIG. 9 depicts another logic flow consistent with the present embodiments.

FIG. 9 depicts another logic flow 900 consistent with the present embodiments. At block 902, a first set of sub-band PMIs is transmitted spanning a first frequency range at a first instance. At block 904 a first band part rank indicator is transmitted spanning the first frequency range at the first instance. At block 906, a second sub-band PMI is transmitted over a second frequency range at the first instance. At block 908, a second band part rank indicator spanning the second frequency range is transmitted at the second instance. In various embodiments the procedures in blocks 902-908 may be repeated at additional second, third, fourth instances, and so forth. In some embodiments, the first and second band part rank indicators may each span frequency ranges that are greater than the corresponding first and second frequency ranges, so that the frequency range spanned by each band part rank indicator may cover multiple frequency sub-bands corresponding to multiple PMIs.

Figure 10A:
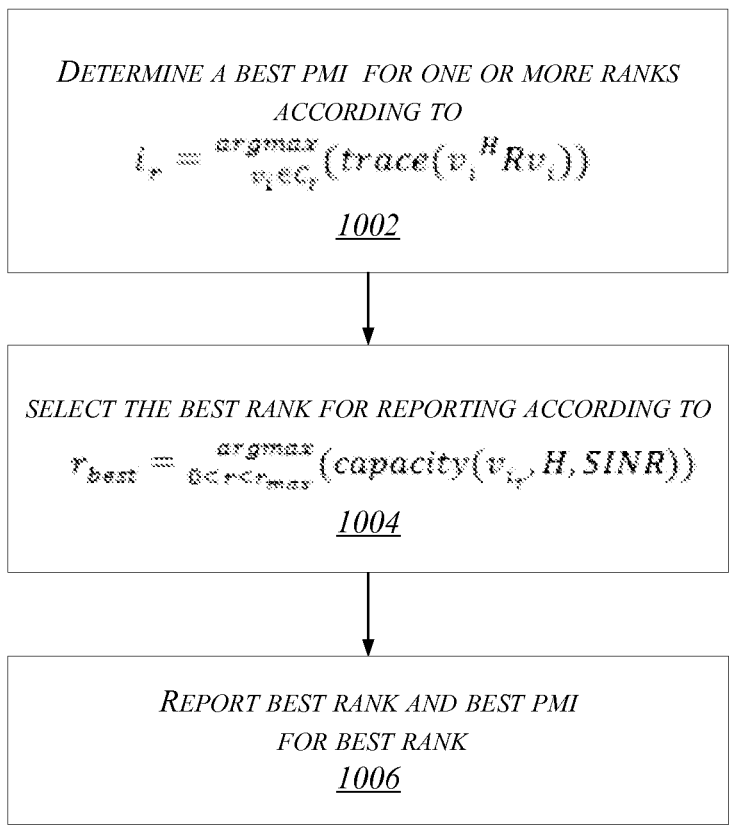
FIG. 10a depicts another logic flow consistent with further embodiments.

FIG. 10a depicts another logic flow 1000 consistent with further embodiments. At block 1002, a best PMI $i_r$ is determined according to Eq (1) set forth above. The value $i_r$ may be determined for multiple ranks r. At block 1004, a best rank $r_{best}$ for reporting to base station is determined according to Eq. (2) set forth above. At block 1006, based upon the determination of $i_r$ and $r_{best}$ the best rank and the best PMI for the best rank are reported to a base station.

FIG. 10b depicts a further logic flow 1020 consistent with other embodiments. At block 1022, the best rank 1 PMI $r_0$ is determined in accordance with Eq. (3) set forth above. At block 1024, the best PMI $i_r$ is set to be the same as the best rank 1 PMI $r_0$. At block 1026, rank adaptation is performed to determine the best rank $r_{best}$ for reporting to base station is determined according to Eq. (2). By adopting the logic flow 1020, when operating in an SU-MIMO mode, a UE may experience a slight decrease in performance. However, the logic flow 1020 may still provide a net improvement in MU-MIMO performance in comparison to the decrease in SU-MIMO that is substantial.

Figure 10C:
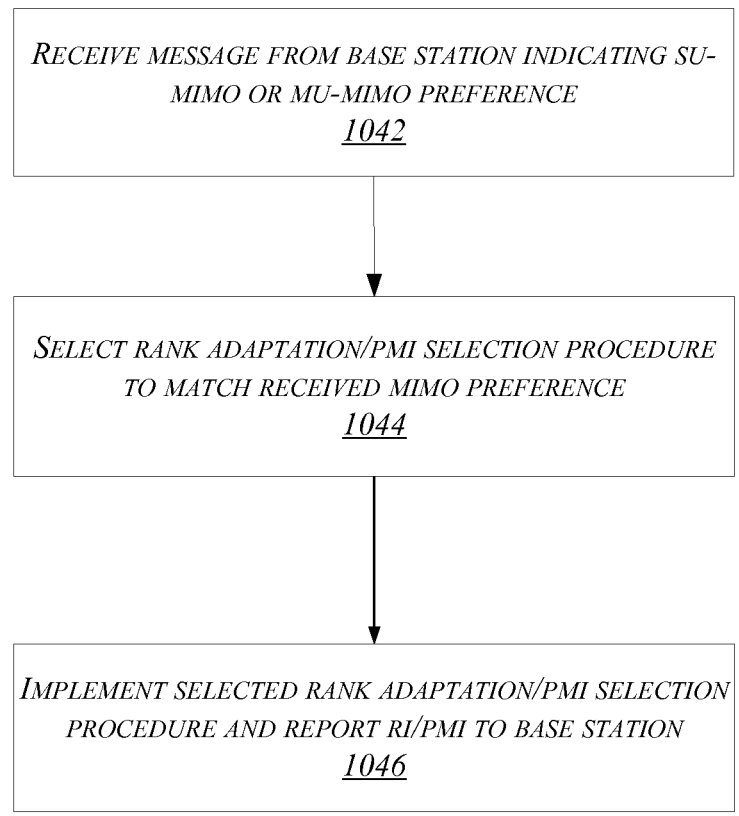
FIG. 10c depicts a further logic flow consistent with other embodiments.

FIG. 10c depicts a further logic flow 1040 consistent with other embodiments. At block 1042 a message from a base station is received indicating MIMO preference. At block 1044, a combination of rank adaptation/PMI selection procedure is selected to match the MIMO preference. At block 1046, the chosen rank adaptation/PMI selection procedure is implemented and appropriate PMI/RI reported to base station. In various embodiments, the implementation of rank adaptation and PMI selection follows any appropriate combination of the embodiments discussed with respect to Eqs. (1)-(4) and depicted in FIGS. 7a-10b.

Figure 11:
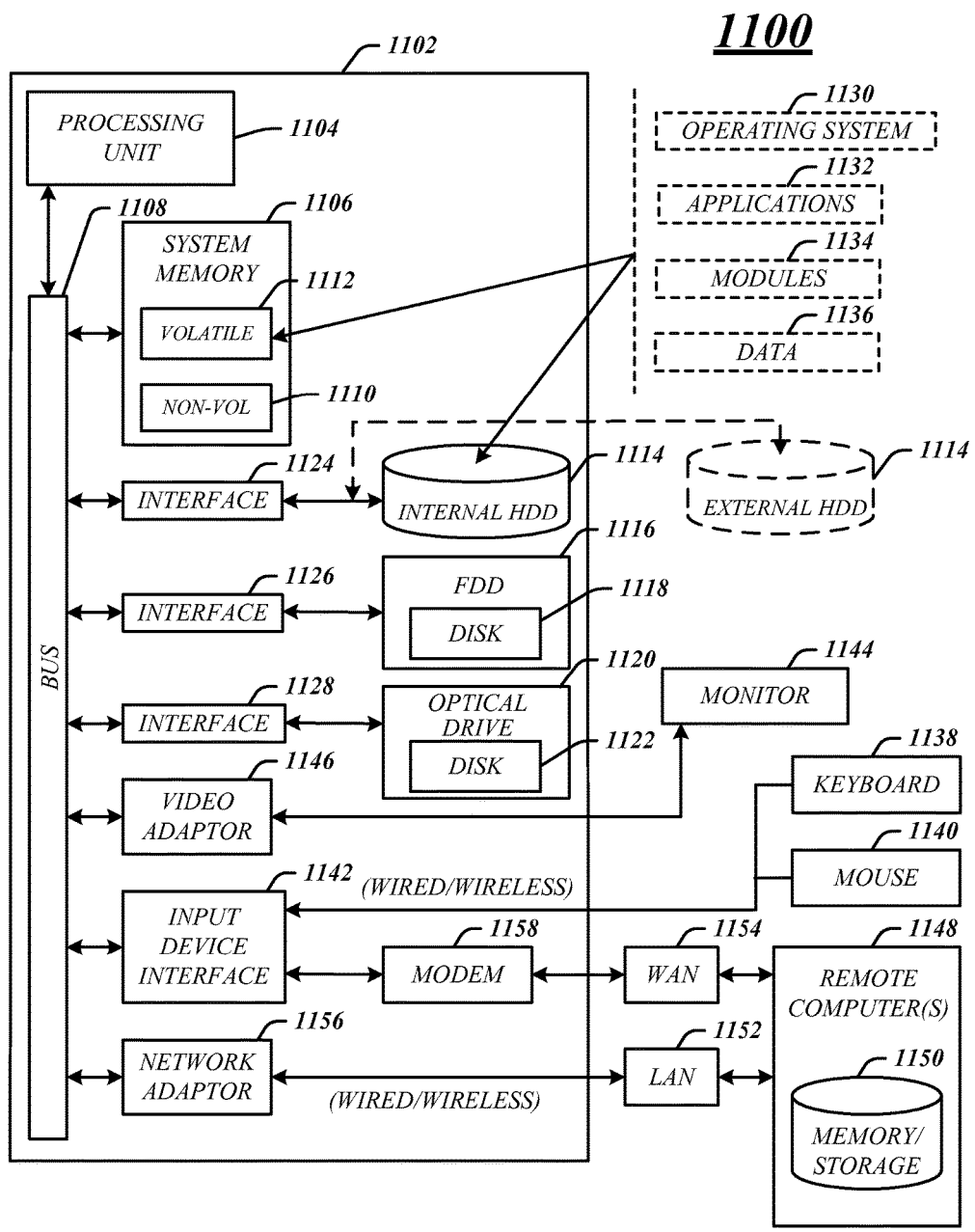
FIG. 11 illustrates an embodiment of an exemplary computing architecture.

FIG. 11 illustrates an embodiment of an exemplary computing architecture 1100 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1100 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1100 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors. Dual microprocessors and other multi processor architectures may also be employed as the processing unit 1104. The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1194 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136.

A user can enter commands and information into the computer 1102 through one or more wire/wireless input devices, for example, a keyboard 1138 and a pointing device, such as a mouse 1140. Other input devices may include a microphone, an infra-red (IR) remote control, a joystick, a game pad, a stylus pen, touch screen, or the like. These and other input devices are often connected to the processing unit 1104 through an input device interface 1142 that is coupled to the system bus 1108, but can be connected by other interfaces such as a parallel port, IEEE 1194 serial port, a game port, a USB port, an IR interface, and so forth.

A monitor 1144 or other type of display device is also connected to the system bus 1108 via an interface, such as a video adaptor 1146. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
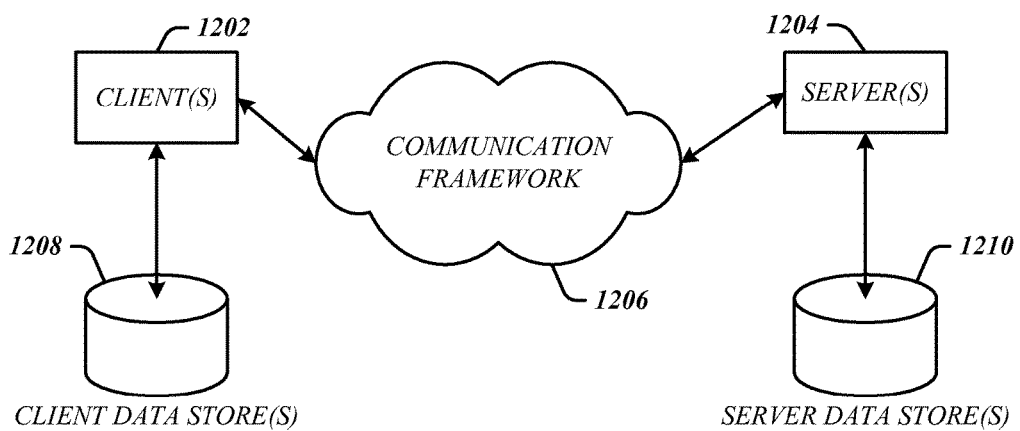
FIG. 12 illustrates a block diagram of an exemplary communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, and so forth. The embodiments, however, are not limited to implementation by the communications architecture 1200.

As shown in FIG. 12, the communications architecture 1200 comprises includes one or more clients 1202 and servers 1204. The clients 1202 may implement the client systems 310, 400. The servers 1204 may implement the server system 330. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols, such as those described with reference to system 1100. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Figure 13:
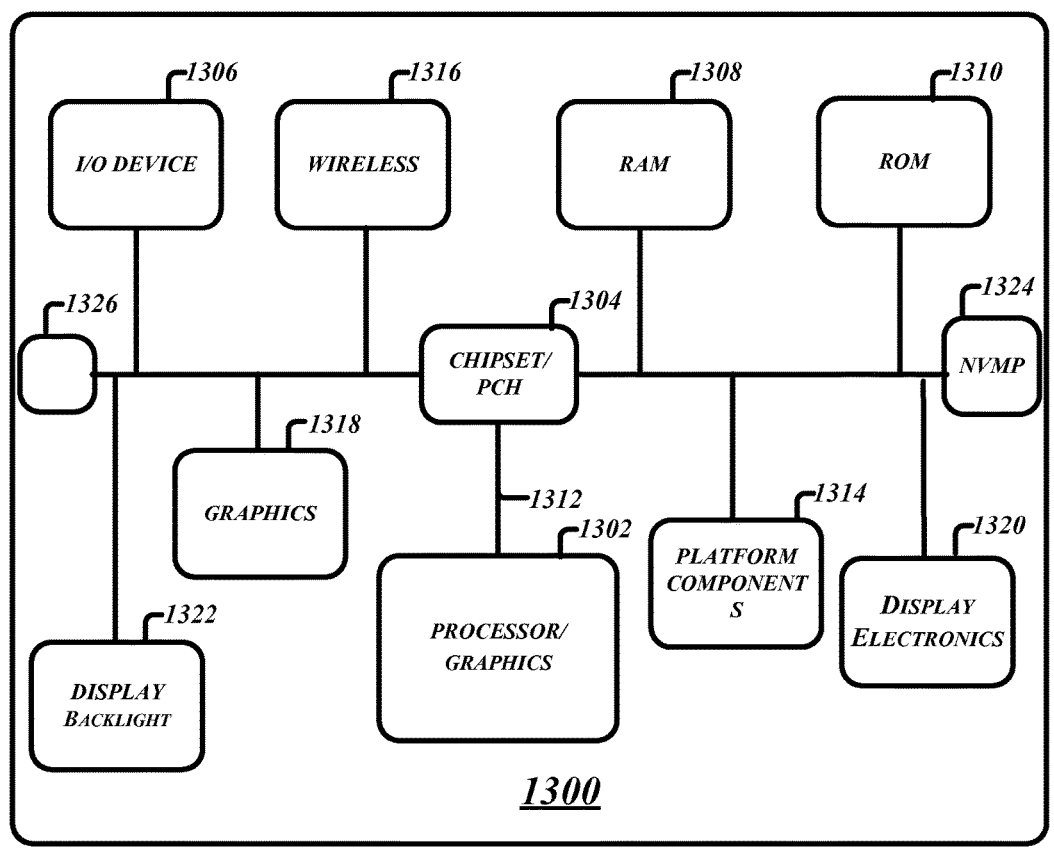
FIG. 13 is a diagram of an exemplary system embodiment.

FIG. 13 is a diagram of an exemplary system embodiment and in particular, FIG. 13 is a diagram showing a platform 1300, which may include various elements. For instance, FIG. 13 shows that platform (system) 1310 may include a processor/graphics core 1302 which may include an applications processor, a chipset/platform control hub (PCH) 1304, an input/output (I/O) device 1306, a random access memory (RAM) (such as dynamic RAM (DRAM)) 1308, and a read only memory (ROM) 1310, display electronics 1320, display backlight 1322, non-volatile memory port 1324, antenna 1326 and various other platform components 1314 (e.g., a fan, a crossflow blower, a heat sink, DTM system, cooling system, housing, vents, and so forth). System 1300 may also include wireless communications chip 1316 and graphics device 1318. The display electronics may include a liquid crystal display (LCD) screen, touch screen display, or other display. The I/O device 1306 may include a keyboard, mouse, and/or speakers. The embodiments, however, are not limited to these elements.

As shown in FIG. 13, I/O device 1306, RAM 1308, and ROM 1310 are coupled to processor 1302 by way of chipset 1304. Chipset 1304 may be coupled to processor 1302 by a bus 1312. Accordingly, bus 1312 may include multiple lines.

Processor 1302 may be a central processing unit comprising one or more processor cores and may include any number of processors having any number of processor cores. The processor 1302 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1302 may be multiple separate processors located on separate integrated circuit chips. In some embodiments processor 1302 may be a processor having integrated graphics, while in other embodiments processor 1302 may be a graphics core or cores.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus comprising:
a modulation logic to be executed at least in part by a baseband processor, the modulation logic to cause channel status reports for channels within a transmission band to be wirelessly transmitted;
a report logic to direct the modulation logic to cause the channel status reports to be wirelessly transmitted, the channel status reports to include:
a multiplicity of sub-band channel quality indicator (CQI) reports, each sub-band CQI report to comprise a measurement of a respective sub-band of the transmission band;
a sub-band rank indicator (RI) report from among a multiplicity of RI reports, the sub-band RI report to accompany the multiplicity of CQI reports; and
a multiplicity of sub-band precoding matrix index (PMI) reports, one or more sub-band PMI reports from among the multiplicity of sub-band PMI reports to correspond to one or more respective sub-band CQI reports from among the multiplicity of sub-band CQI reports;
a receive logic executed, at least in part, by the baseband processor to receive wireless downlink communications that include one or more data streams over the transmission band, at least portions of the wireless downlink communications to occur at a first sub-band of the transmission band, the first sub-band characterized by a rank r to specify a number of data streams to be substantially simultaneously communicated over the first sub-band;
a memory arranged to maintain a multiple rank codebook; and
the report logic to:
search the multiple rank codebook and determine a respective best PMI $i_r$ for each of a multiplicity of ranks of the multiple rank codebook;
select a rank $r_{best}$ to be used at the first sub-band based on the respective best PMIs $i_r$ for the multiplicity of ranks; and
direct the modulation logic to cause the selected rank $r_{best}$ to be wirelessly transmitted in the sub-band RI report for the first sub-band and include the respective best PMI $i_r$ in a first PMI report for the first sub-band.

2. The apparatus of claim 1, the report logic to direct the modulation logic to cause the channel status reports to be wirelessly transmitted according to a first 3GPP long term evolution (LTE) technical specification (TS) to include TS 36.213.

3. The apparatus of claim 2, the modulation logic to cause the channel status reports to be aperiodically wirelessly transmitted using transmission modes 4, 8 or 9.

4. The apparatus of claim 3, the multiplicity of sub-band CQI and PMI reports included in the channel status reports arranged according to a physical uplink shared control channel (PUSCH) 3-2 report mode.

5. The apparatus of claim 4, the multiplicity of sub-band CQI and PMI reports included in the channel status reports are calculated conditioned on the sub-band RI report to accompany the one or more respective sub-band CQI reports and the one or more respective sub-band PMI reports.

6. The apparatus of claim 1, comprising the sub-band RI report from among the multiplicity of sub-band RI reports to correspond to a same sub-band of the transmission band for one or more respective sub-band CQIs from among the multiplicity of sub-band CQI reports.

7. The apparatus of claim 1, comprising the channel status reports to be aperiodically or periodically wirelessly transmitted.

8. The apparatus of claim 1, the report logic to determine $i_r$ according to $$i_r = \underset{v_i \in C_r}{\operatorname{argmax}}(\operatorname{trace}(v_i^H R v_i))$$

where $C_r$ is a codebook having rank r.

9. The apparatus of claim 1, the report logic to determine $r_{best}$ according to $$r_{best} = \underset{0 < r < r_{max}}{\operatorname{argmax}}(\operatorname{capacity}(v_{i_r} H, SINR)).$$

10. The apparatus of claim 1, the report logic to select the rank $r_{best}$ in response to a control signal from an evolved Node B (eNB), the control signal to indicate a preference of MIMO mode.

11. A method comprising:
causing, at a baseband processor for user equipment (UE)), channel status reports for channels within a transmission band to be wirelessly transmitted, the channel status reports including:
a multiplicity of sub-band channel quality indicator (CQI) reports, each sub-band CQI report to comprise a measurement of a respective sub-band of the transmission band;
a sub-band rank indicator (RI) report from among a multiplicity of RI reports, the sub-band RI report to accompany the multiplicity of CQI reports; and
a multiplicity of sub-band precoding matrix index (PMI) reports, one or more sub-band PMI reports from among the multiplicity of sub-band PMI reports to correspond to one or more respective sub-band CQI reports from among the multiplicity of CQI reports;
and
receiving wireless downlink communications that include one or more data streams over the transmission band, at least portions of the wireless downlink communications to occur at a first sub-band of the transmission band, the first sub-band characterized by a rank r to specify a number of data streams to be substantially simultaneously communicated over the first sub-band;
searching a multiple rank codebook maintained in a memory for the UE to determine a respective best PMI $i_r$ for each of a multiplicity of ranks of the multiple rank codebook;
selecting a rank $r_{best}$ to be used at the first sub-band based on the respective best PMIs $i_r$ for the multiplicity of ranks;
causing the selected rank $r_{best}$ to be wirelessly transmitted in via the sub-band RI report for the first sub-band; and
causing the respective best PMI $i_r$ to be wirelessly transmitted via a first PMI report for the first sub-band.

12. The method of claim 11, the channel status reports to be wirelessly transmitted according to a first 3GPP long term evolution (LTE) technical specification (TS) to include TS 36.213.

13. The method of claim 12, transmitting the channel status reports aperiodically using transmission modes 4, 8 or 9.

14. The method of claim 13, the multiplicity of sub-band CQI and PMI reports included in the channel status reports arranged according to a physical uplink shared control channel (PUSCH) 3-2 report mode.

15. The method of claim 14, comprising:
determining the multiplicity of sub-band CQI and PMI reports conditioned on the sub-band RI report to accompany the one or more respective sub-band CQI reports and the one or more respective sub-band PMI reports.

16. The method of claim 11, comprising the sub-band RI report from among the multiplicity of sub-band RI reports to correspond to a same sub-band of the transmission band for one or more respective sub-band CQIs from among the multiplicity of sub-band CQI reports.

17. The method of claim 11, comprising the channel status reports to be aperiodically or periodically wirelessly transmitted.

18. The method of claim 11, selecting the rank $r_{best}$ in response to receiving a control signal from an evolved Node B (eNB), the control signal to indicate a preference of MIMO mode.

19. At least one non-transitory machine readable medium comprising a plurality of instructions that in response to being executed by a system cause the system to:
cause channel status reports to be wirelessly transmitted for wireless channels within a transmission band, the channel status reports to include:
a multiplicity of sub-band channel quality indicator (CQI) reports, each sub-band CQI report to comprise a measurement of a respective sub-band of the transmission band;
a sub-band rank indicator (RI) report from among a multiplicity of RI reports, the sub-band RI report to accompany the multiplicity of CQI reports; and
a multiplicity of sub-band precoding matrix index (PMI) reports, one or more sub-band PMI reports from among the multiplicity of sub-band PMI reports to correspond to one or more respective sub-band CQI reports from among the multiplicity of sub-band CQI reports;
and
receive wireless downlink communications that include one or more data streams over the transmission band, at least portions of the wireless downlink communications to occur at a first sub-band of the transmission band, the first sub-band characterized by a rank r to specify a number of data streams to be substantially simultaneously communicated over the first sub-band;
search a multiple rank codebook maintained in a memory for the system, the search to determine a respective best PMI $i_r$ for each of a multiplicity of ranks of the multiple rank codebook;
select a rank $r_{best}$ to be used at the first sub-band based on the respective best PMIs $i_r$ for the multiplicity of ranks;
cause the selected rank $r_{best}$ to be wirelessly transmitted via the sub-band RI report for the first sub-band; and
cause the respective best PMI $i_r$ to be wirelessly transmitted via a first PMI report for the first sub-band.

20. The at least one non-transitory machine readable medium of claim 19, the instructions to further cause the system to wirelessly transmit the channel status reports in accordance with a first 3GPP long term evolution (LTE) technical specification (TS) to include TS 36.213.

21. The at least one non-transitory machine readable medium of claim 20, the instructions to cause the system to cause the channel status reports to be aperiodically wirelessly transmitted using transmission modes 4, 8 or 9.

22. The at least one non-transitory machine readable medium of claim 21, the multiplicity of sub-band CQI and PMI reports included in the channel status reports arranged according to a physical uplink shared control channel (PUSCH) 3-2 report mode.

23. The at least one non-transitory machine readable medium of 22, the instructions to further cause the system to:
determine the multiplicity of sub-band CQI and PMI reports conditioned on the sub-band RI report to accompany the one or more respective sub-band CQI reports and the one or more respective sub-band PMI reports.

24. The at least one non-transitory machine readable medium of 19, comprising the sub-band RI report from among the multiplicity of sub-band RI reports to correspond to a same sub-band of the transmission band for one or more respective sub-band CQIs from among the multiplicity of sub-band CQI reports.

25. The at least one non-transitory machine readable medium of 19, comprising the channel status reports to be aperiodically or periodically wirelessly transmitted.

26. The at least one non-transitory machine readable medium of claim 19, the instructions to further cause the system to select the rank $r_{best}$ in response to a control signal from an evolved Node B (eNB), the control signal to indicate a preference of MIMO mode.

27. User Equipment (UE) comprising:
a transmitter arranged to wirelessly transmit within a transmission band;
a modulation logic executed at least in part by a baseband processor, the modulation logic to cause channel status reports for channels within the transmission band to be wirelessly transmitted by the transmitter;
a report logic to direct the modulation logic to cause the channel status reports to be wirelessly transmitted, the channel status reports to include:
  a multiplicity of sub-band channel quality indicator (CQI) reports, each sub-band CQI report to comprise a measurement of a respective sub-band of the transmission band;
  a sub-band rank indicator (RI) report from among a multiplicity of RI reports, the sub-band RI report to accompany the multiplicity of CQI reports; and
  a multiplicity of sub-band precoding matrix index (PMI) reports, one or more sub-band PMI reports from among the multiplicity of sub-band PMI reports to correspond to one or more respective sub-band CQI reports from among the multiplicity of sub-band CQI reports;
and
a receive logic executed, at least in part, by the baseband processor to receive wireless downlink communications that include one or more data streams over the transmission band, at least portions of the wireless downlink communications to occur at a first sub-band of the transmission band, the first sub-band characterized by a rank r to specify a number of data streams to be substantially simultaneously communicated over the first sub-band;
a memory arranged to maintain a multiple rank codebook; and
the report logic to:
  search the multiple rank codebook and determine a respective best PMI $i_r$ for each of a multiplicity of ranks of the multiple rank codebook;
  select a rank $r_{best}$ to be used at the first sub-band based on the respective best PMIs $i_r$ for the multiplicity of ranks; and
  direct the modulation logic to cause the selected rank $r_{best}$ to be wirelessly transmitted in the sub-band RI report for the first sub-band and include the respective best PMI $i_r$ in a first PMI report for the first sub-band.

28. The UE of claim 27, the report logic to direct the modulation logic to cause the channel status reports to be wirelessly transmitted according to a first 3GPP long term evolution (LTE) technical specification (TS) to include TS 36.213.

29. The UE of claim 28, the modulation logic to cause the channel status reports to be aperiodically wirelessly transmitted using transmission modes 4, 8 or 9.

30. The UE of claim 29, the multiplicity of sub-band CQI and PMI reports included in the channel status reports arranged according to a physical uplink shared control channel (PUSCH) 3-2 report mode.

31. The UE of claim 30, the multiplicity of sub-band CQI and PMI reports included in the channel status reports are calculated conditioned on the sub-band RI report to accompany the one or more respective sub-band CQI reports and the one or more respective sub-band PMI reports.

32. The UE of claim 27, comprising one or more separate sub-band RI reports from among the multiplicity of sub-band RI reports to correspond to a same sub-band of the transmission band for one or more respective sub-band CQIs from among the multiplicity of sub-band CQI reports.

33. The UE of claim 27, comprising the channel status reports to be aperiodically or periodically wirelessly transmitted.

34. The UE of claim 27, the report logic to select the rank $r_{best}$ in response to a control signal from an evolved Node B (eNB), the control signal to indicate a preference of MIMO mode.

* * * * *